Aug. 19, 1941. L. P. SHARPLES Re. 21,882
CENTRIFUGAL SEPARATOR
Original Filed Feb. 25, 1936
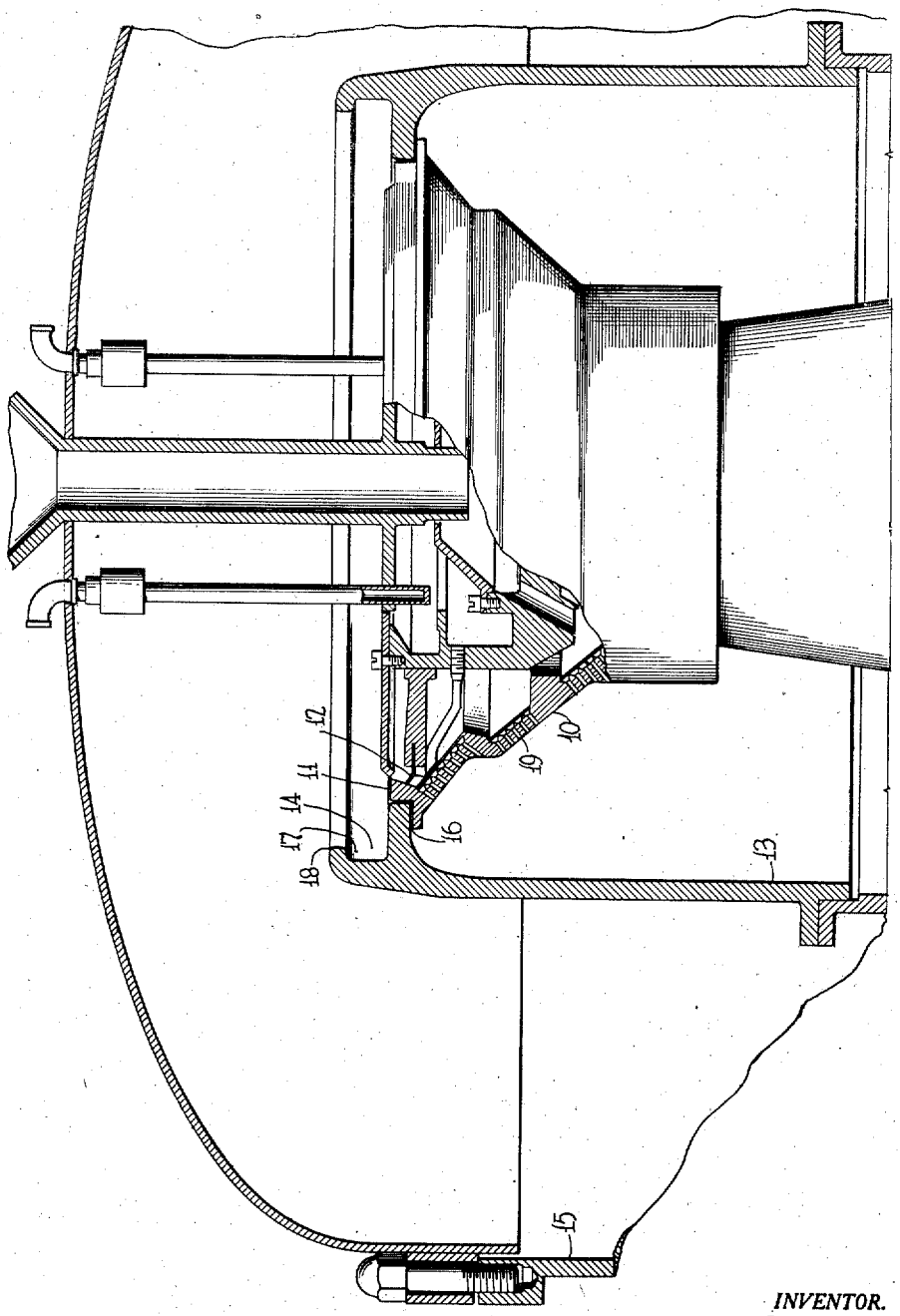
INVENTOR.
LAURENCE P. SHARPLES.
BY Maurice A. Crews
ATTORNEY.

Reissued Aug. 19, 1941

Re. 21,882

UNITED STATES PATENT OFFICE 21,882

CENTRIFUGAL SEPARATOR

Laurence Price Sharples, Ardmore, Pa., assignor to The Sharples Corporation, a corporation of Delaware Original No. 2,147,414, dated February 14, 1939, Serial No. 65,544, February 25, 1936. Application for reissue July 28, 1939, Serial No. 287,070

9 Claims. (Cl. 210—73)

The present invention pertains to the centrifugal dehydration of solids and relates particularly to the provision of a centrifugal separator of improved construction designed to effect removal of liquid from solids. An example of a separating operation for which the machine of the invention is especially suitable is the separation of mother liquor from crystals formed by the cooling of such liquor.

A difficult problem has been encountered in the operation of machines of the prior art designed to perform separating functions of this character by reason of the tendency of solids discharged from the centrifugal rotor to adhere to surfaces which they strike after such discharge. In many cases, a part of the solids discharged progressively build up in the form of a cake to such an extent as to effectively block further discharge of solids from the rotor. The present invention is particularly concerned with the avoidance of this tendency of discharged solids to adhere to impacted surfaces.

This object is achieved by the provision of a special design of receiving and deflecting member adapted to receive and discharge solids leaving the centrifugal rotor. Reference is made to the attached drawing for illustration of the details of the invention and its principle of operation. In that drawing, the single figure illustrates the parts associated with the rotor and upper end of a centrifugal separator illustrating the invention, the view being partly in cross section and partly in side elevation.

Referring to the drawing by reference characters, a rotor 10 is illustrated which affords a plurality of successive separating stages. The general features of design of the machine by which the solids are dehydrated and discharged from the upper end 11 of the rotor may be of any known character, but these features are preferably similar to those illustrated in my prior Patent 2,095,206, granted October 5, 1937. The dehydrated solids are preferably discharged from the rotor by means of a plurality of plows 12 which are arranged at an angle to the wall of the rotor and rotated at a speed slightly different from that of the rotor in order to discharge the solids in a manner well understood in this art. Reference is made to the patent to Brewer No. 1,991,490 for a more detailed description of the construction and principle of operation of plows of this character. Features of rotor and plow design form no part of the present invention.

A stationary casing 13 surrounds the rotor and receives the liquid discharged therefrom through openings 19 provided in the wall of the rotor. The novel features of the invention consist in a novel member 14 for receiving and discharging solids projected in a substantially tangential direction from the inner circumference of the upper end 11 of the rotor. In the form of the invention illustrated in the drawing, this novel receiving and discharging member is illustrated as formed integrally with the casing 13, but it is to be understood that the invention is in no way limited to such integral formation of such receiving and deflecting member. As illustrated in the drawing, this novel member constitutes flange 16 whose upper surface lies in substantially the same plane as the plane of discharge of solids in the upper end 11 of the rotor, (horizontally, as illustrated), cylindrical deflector surface 17 at the outer circumference of the horizontally extending flange 16 extending substantially at right angles to the plane of discharge and an overhanging lip 18 at the upper extremity of the cylinder 17.

An important feature of the invention consists in the fact that the flange 16 is of relatively narrow width and that the surface 17 forming a continuation of the flange 16 accordingly lies in close proximity to the circumference of the rotor, and accordingly has a radius of curvature but slightly larger than that of the rotor.

Experience has demonstrated that this relatively simple form of deflector member avoids the difficulties discussed above incident to adhesion of discharged solids to surfaces impacted by such discharged solids in the operation of centrifugal extractors of this general type in prior art practice. In the operation of the machine illustrated in the drawing, solids discharged from the rapidly rotating rotor 10 are projected in a direction from the inner circumference of the upper wall 11 of the rotor which is substantially tangential to the circumference of that wall. In view of the fact that the vertical wall of the surface 17 of the deflecting and discharging member 14 is arranged in close proximity to the upper wall 11 of the rotor, the circumference of the surface 17 is but slightly larger than that of the upper wall 11 of the rotor. In view of this fact, solids discharged tangentially from the upper wall of the rotor will strike the surface 17 almost tangentially with respect to that wall; i. e., the angle at which such solids will strike the wall in question is so slight that the solids will not cling to it. The fact that the wall 17 extends at right angles to the plane of discharge of solids causes a retardation of the solids by friction prior to their discharge over the wall and the provision of the inwardly extended lip or flange 18 also retards the tendency of these solids to be discharged over that wall. As the result of these two features of construction, the solids after discharging from the rotor run for some distance around the circumference of the surface 17 where they lose velocity due to friction. They are then smoothly impelled over the flange 18 and outwardly into the zone between the casing 13 and the surrounding housing 15.

Another factor which is believed to contribute to the advantageous result attained consists in the fact that the substantially tangential discharge of solids against the inner wall of the flange 17 effects an action analogous to sandblasting in removing previously discharged solids which may have adhered to that flange. The arrangement of the flange in question as illustrated in the drawing contributes importantly to this function, for the impingement of solids against the inner surface of the flange at only a slight angle with respect to that surface assists in the dislodgment of adhering solids and the fact that the flange 17 is very close to the upper wall 11 of the rotor also assists in this dislodging function because of the fact that the discharged solids strike the flange 17 before they have lost substantial velocity by air friction or otherwise, and these discharged solids accordingly strike the flange with sufficient force to dislodge any solids which may previously have adhered thereto.

The ratio of the diameter of the inner wall of the flange 17 to that of the inner surface of the portion of the wall 11 of the rotor from which the solids are discharged is preferably 3:2 or less and in the best form of the invention it is 6:5 or less. Excellent commercial results have been obtained in the discharge of dehydrated ammonium sulphate crystals by a centrifuge constructed in accordance with the invention in which the diameter of the circle described by the crystal discharging extremity of the wall 11 was 13 inches and the diameter of the circle described by the inner surface of the flange 17 was 14½ inches.

Modifications will be obvious to those skilled in the art and I do not therefore wish to be limited except by the scope of the sub-joined claims.

I claim:

1. A centrifugal separator comprising a centrifugal rotor adapted to effect dehydration of solids and radial discharge of such solids from the rotor in a substantially horizontal plane under the influence of centrifugal force during the rotation thereof, and a solids receiving member having a concentric wall surrounding the solids discharging surface of the rotor over which wall solids are adapted to be discharged, said wall extending upwardly from the plane of the rotor discharge and substantially at right angles thereto and having a radius of curvature at all solids receiving points thereof which is but slightly larger than the radius of curvature of the solids discharging surface of the rotor, and being of sufficiently small height to permit the discharge of solids upwardly thereover.

2. A centrifugal separator comprising a centrifugal rotor adapted to effect dehydration of solids and discharge of such solids from the rotor in a substantially horizontal plane under the influence of centrifugal force during the rotation thereof, and a solids receiving member having a substantially vertical concentric wall surrounding the solids discharging surface of the rotor over which wall solids are adapted to be discharged, said wall extending upwardly from the plane of the solids discharging surface of the rotor and having a radius of curvature at all solids receiving points thereof which is but slightly larger than the radius of curvature of the solids discharging surface of the rotor, and being of sufficiently small height to permit the discharge of solids upwardly thereover.

3. A centrifugal separator comprising a centrifugal rotor adapted to effect dehydration of solids and discharge of such solids from the rotor in a substantially horizontal plane under the influence of centrifugal force during the rotation thereof, and a solids receiving member having a solids supporting surface substantially parallel to the plane of discharge of the solids and immediately beneath said plane and a wall over which solids are adapted to be discharged forming a continuation of said solids supporting surface and extending upwardly at an angle with respect to said solids supporting surface, said wall being substantially concentric with the solids discharging surface of the rotor and lying in close proximity thereto, and being of sufficiently small height to permit the discharge of solids upwardly thereover.

4. A centrifugal separator comprising a centrifugal rotor adapted to effect dehydration of solids and discharge of such solids from the rotor in a substantially horizontal plane under the influence of centrifugal force during the rotation thereof, and a solids receiving member having a solids supporting surface substantially parallel to the plane of discharge of the solids and immediately beneath said plane and a wall over which solids are adapted to be discharged forming a continuation of said solids supporting surface and extending upwardly and substantially vertically, said wall being substantially concentric with the solids discharging surface of the rotor and lying in close proximity thereto, and being of sufficiently small height to permit the discharge of solids upwardly thereover.

5. A centrifugal separator comprising a centrifugal rotor adapted to effect dehydration of solids and discharge of such solids from the rotor in a substantially horizontal plane under the influence of centrifugal force during the rotation thereof, and a solids receiving member having a solids supporting surface substantially parallel to the plane of discharge of the solids and immediately beneath said plane, a wall over which solids are adapted to be discharged forming a continuation of said solids supporting surface and extending upwardly at an angle with respect to said solids supporting surface, said wall being substantially concentric with the solids discharging surface of the rotor and lying in close proximity thereto and having an overhanging annular flange extending radially inwardly from the uppermost surface thereof, and being of sufficiently small height to permit the discharge of solids upwardly thereover.

6. A centrifugal separator comprising a centrifugal rotor adapted to effect dehydration of solids and discharge of such solids from the rotor in a substantially horizontal plane under the influence of centrifugal force during the rotation thereof, and a solids receiving member having a solids supporting surface substantially parallel to the plane of discharge of the solids and immediately beneath said plane, a wall over which solids are adapted to be discharged forming a continuation of said solids supporting surface and extending upwardly and substantially vertically, said wall being substantially concentric with the solids discharging surface of the rotor and lying in close proximity thereto, and being of sufficiently small height to permit the discharge of solids upwardly thereover, and an overhanging annular flange extending radially inwardly from the uppermost surface of said wall.

7. A centrifugal separator comprising a centrifugal rotor adapted to effect dehydration of solids and discharge of such solids from the rotor in a substantially horizontal plane under the influence of centrifugal force during the rotation thereof and a solids receiving member and concentric deflecting surfaces extending above the plane of solids discharged adapted to deflect said solids upwardly after discharge from said rotor, said deflecting surfaces lying in close proximity to the solids discharging surface of said rotor and being of sufficiently small height to permit the discharge of solids upwardly thereover.

8. A centrifugal separator comprising a centrifugal rotor provided with a circumferential wall, means to feed a mixture of liquid and solids to the space within said circumferential wall to effect dehydration of the solids, said rotor being provided with means for discharging liquid therefrom and for separately discharging solids under the influence of centrifugal force in a plane which is substantially at right angles to the axis of said rotor, and a solids receiving member consisting of a circumferential receiving wall surrounding the solids discharging surface of said rotor, said circumferential wall being of sufficient length axially of the rotor to receive and temporarily retain, circumferentially deflect and retard said solids, said circumferential wall having a diameter which bears a ratio of not greater than 6:5 to the diameter of the solids discharging surface of the rotor, and said circumferential wall lying in such close proximity to the solids discharging surface of the rotor that solids discharged from the rotor in a direction which is tangential with respect to the discharging surface of the rotor strike said circumferential receiving wall in a substantially tangential direction and are deflected annularly about the surface of said receiving wall in substantially the same plane as the plane of discharge of said solids from the rotor.

9. A centrifugal separator as defined in claim 8, in which the circumferential receiving wall is provided with a flange extending inwardly toward the rotor axis to assist in retaining the solids within said wall until said solids are retarded to a sufficient extent to avoid stickage upon discharge from said wall.

LAURENCE PRICE SHARPLES.